Figure 1:
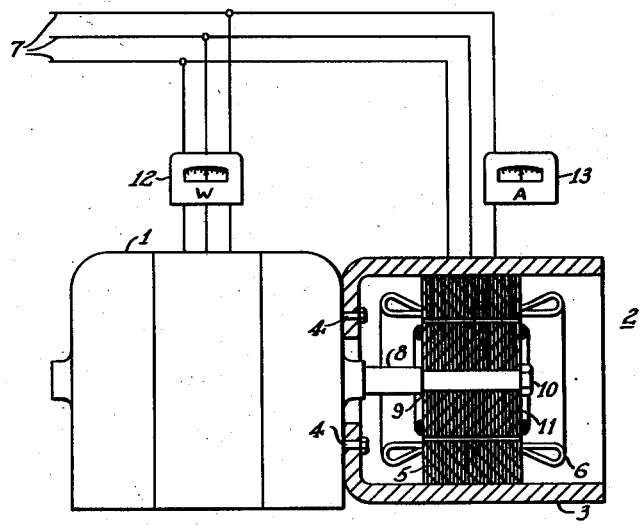

Sept. 18, 1951 L. C. PACKER ET AL 2,568,406
METHOD AND MEANS FOR TESTING ROTORS
Filed Feb. 24, 1947 2 Sheets—Sheet 1

WITNESSES:

INVENTORS
Lewis C. Packer and
George E. Monchamp.
BY
ATTORNEY

Sept. 18, 1951     L. C. PACKER ET AL     2,568,406
METHOD AND MEANS FOR TESTING ROTORS
Filed Feb. 24, 1947     2 Sheets-Sheet 2

WITNESSES:

INVENTORS
Lewis C. Packer and
George E. Monchamp.
BY
ATTORNEY

UNITED STATES PATENT OFFICE 2,568,406

METHOD AND MEANS FOR TESTING ROTORS

Lewis C. Packer, Longmeadow, and George E. Monchamp, Holyoke, Mass., assignors to Westinghouse Electric Corporation, East Pittsburgh, Pa., a corporation of Pennsylvania Application February 24, 1947, Serial No. 730,366

8 Claims. (Cl. 175—183)

The present invention relates to a method and means for testing squirrel-cage rotors for electric motors, and, more particularly, to a rapid and inexpensive method for testing such rotors for stray loss and for rotor resistance.

The squirrel-cage rotors of alternating-current induction motors have certain losses in operation which are usually referred to as stray load losses, or stray losses. These stray losses consist chiefly of eddy current losses in the squirrel-cage bars and in the core laminations, and hysteresis loss in the laminations. The magnitude of the stray losses is affected by numerous factors, such as short-circuiting of adjacent laminations by the squirrel-cage bars or as a result of machining the completed rotor, variations in permeability of the laminations due to strains introduced in the punching operation, inadequate insulation between adjacent laminations, and other factors. Many of the factors which affect the stray loss are subject to considerable variation in the manufacture of the rotor, especially in the case of rotors in which the squirrel-cage winding is diecast in place, and these variable factors are difficult to control in production. If the stray losses become too high, the performance of the motor in which the rotor is used is adversely affected. Excessive losses, which adversely affect the performance, may also occur if the resistance of the rotor is too high, which may be caused by broken bars or, in the case of die-cast rotors, by porosity of the cast metal.

Since high stray losses and high rotor resistance adversely affect the performance of the rotor in an electric motor, and since the stray losses and rotor resistance are affected by numerous, more or less uncertain factors which are difficult to control in production, it is desirable to apply a test to all completed rotors as a routine step in the manufacturing process, in order to detect unsatisfactory rotors before the expense of assembling them into complete motors is incurred. This requires a test which can be applied rapidly, and which is relatively inexpensive, so that all rotors can be tested without unduly delaying production, or increasing the cost. Various methods, such as brake tests, have been used for determining stray losses, but such tests take too much time and are too expensive to apply as routine tests to all rotors as they are completed.

The principal object of the present invention is to provide a method and means for testing squirrel-cage rotors for stray loss, which is relatively inexpensive and can be rapidly carried out.

Another object of the invention is to provide a rapid and inexpensive method and means for testing squirrel-cage rotors for both stray loss and high resistance.

A further object of the invention is to provide means for testing squirrel-cage rotors for stray loss and, if desired, for high resistance, which provides a simple test which is easily performed even by inexperienced operators.

In accordance with the present invention, squirrel-cage rotors are tested by placing them in a rotating magnetic field and driving the rotor in the reverse direction, i. e., in the direction opposite to the direction of rotation of the magnetic field. The torque required to drive the rotor in the reverse direction is measured, and this affords a rapid and simple means of checking the rotor for stray loss, since the stray loss is approximately proportional to the torque. The torque may be measured at any desired speed of the rotor in the reverse direction, but since the stray losses are proportional to the square of both the rotor current and the speed, at a given frequency of the rotor current, a high speed is more desirable because the losses are magnified and a more reliable check is obtained. For this reason, it is preferred to drive the rotor at or near synchronous speed in the reverse direction, although any other suitable speed might be utilized.

In carrying out this method a test stator is preferably used, which is provided with a polyphase winding to produce a rotating magnetic field, and the rotor to be tested is placed in the test stator and driven in the reverse direction at the predetermined speed. With this arrangement, the rotor resistance can readily be determined, simultaneously with the stray loss, by measuring the current in the winding of the test stator, since the current in the test stator winding varies inversely with the rotor resistance. This will be apparent from the following considerations. The resistance and reactance of the test stator winding are substantially constant. In a polyphase motor, the air-gap current, i. e., the component of magnetizing current required to overcome the reluctance of the air gap, is relatively small so that slight variations in the air gap will cause very little change in the total load current and in the magnetizing current. The rotor reactance is also reasonably constant, for rotors of the same design, unless there is a broken bar or bars. This, however, increases the resistance, and either broken bars or porosity of the metal increase the resistance of the rotor and thus decrease the total current in the squirrel-cage winding. The total current in the test stator winding therefore varies substantially inversely with the resistance of the rotor, at any given speed, since with rotors of the same design, the rotor resistance is the only variable factor that materially affects the current, and a reliable indication of the rotor resistance is obtained by measuring the current in the test stator winding.

Figure 2:
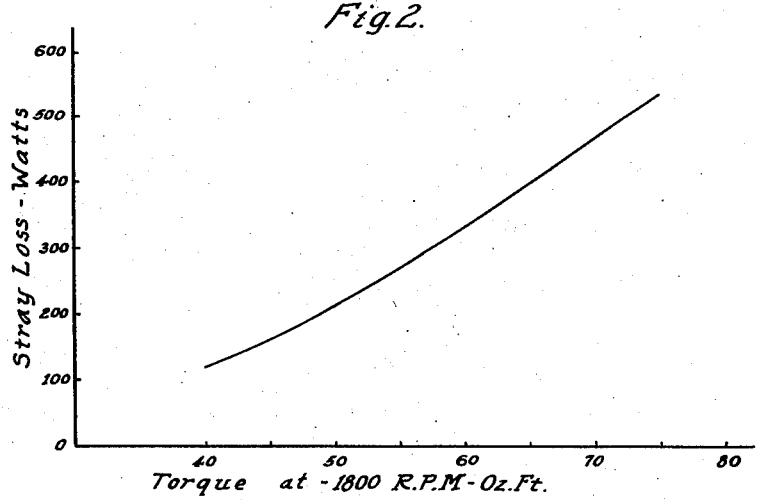
Figure 3:
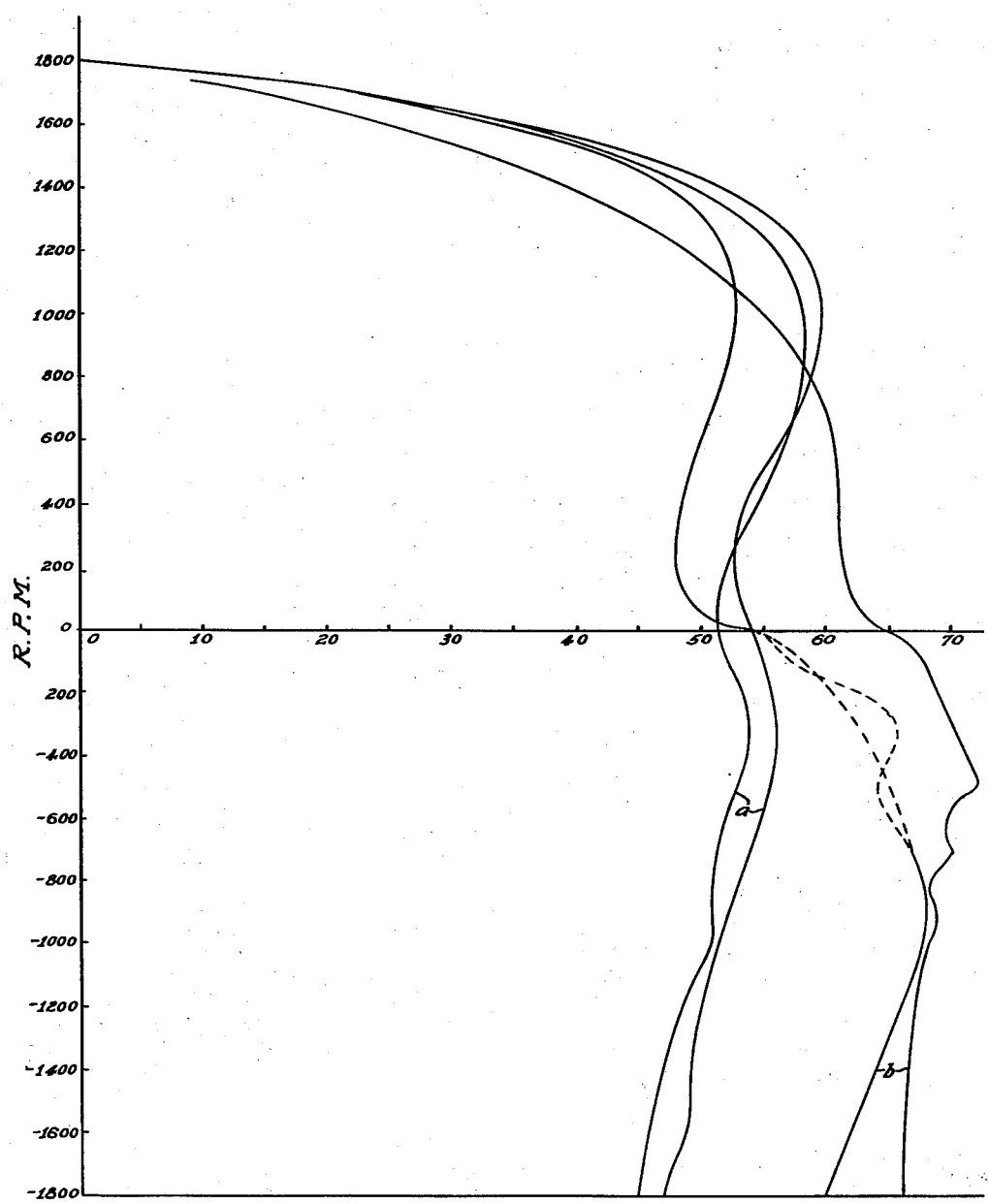

The invention will be more fully understood from the following detailed description, taken in connection with the accompanying drawings, in which:

1. Figure 1 is a somewhat diagrammatic view of a preferred apparatus for carrying out the test;

Fig. 2 is a curve illustrating the relationship between stray loss and torque for a typical rotor design; and Fig. 3 is a diagram showing complete speed-torque curves for several rotors of the same design.

Figure 1 shows a preferred arrangement for testing squirrel-cage rotors in accordance with the present invention. The apparatus shown in this figure includes a driving motor 1 and a test stator 2. The test stator 2 includes a frame member 3, which may be secured to the driving motor 1 in any suitable manner, as by bolts 4, or which might be cast integrally with the end bracket of the motor 1. A laminated stator core 5 is pressed into the frame 3, or otherwise supported therein. The core 5 may be of any usual construction suitable for operation with rotors of the particular design to be tested. A polyphase winding 6, of any suitable type, is placed in the slots of the stator core 5 to produce a rotating magnetic field. The winding 6 may be either a two-phase or a three-phase winding, and is shown in Figure 1 as a three-phase winding, connected to a three-phase line 7.

The driving motor 1 may be any suitable type of constant-speed motor, and is shown as a three-phase alternating-current motor supplied from the line 7. The motor 1 has a shaft 8 extending through the test stator 2, and provided with a shoulder 9 and a nut 10, or other suitable locking means, for removably securing on the shaft a rotor 11 to be tested.

In testing a rotor 11, the rotor is placed on the shaft 8 and locked in position against the shoulder 9 by means of the nut 10. The motor 1 and winding 6 are then energized, the connections being made so that the motor drives the rotor 11 in the reverse direction, i. e., the direction opposite to the direction of rotation of the rotating magnetic field of the winding 6. The torque required to drive the rotor is then a measure of the stray loss in the rotor.

The stray loss in a rotor of any given design is substantially proportional to the torque required to drive the rotor in the reverse direction, at any given speed, as explained above. This relation is illustrated in Fig. 2, which shows the relationship between the stray loss and the torque, for a particular rotor design, at a speed of 1800 R. P. M. in the negative or reverse direction. It will be seen from the curve that the stray loss is very nearly proportional to the torque. This curve was obtained from a large number of tests on rotors of the same design, and when such a curve has been established for any particular design, rotors of that design can readily be tested for stray loss by measuring the torque required to drive them in the reverse direction. The maximum permissible value of stray loss is established by test and analysis, and the torque corresponding to this value of stray loss is determined from the curve. It is then a simple matter to test such rotors since the value of torque thus established is the maximum permissible torque, and any rotor which requires greater torque to drive it at the predetermined speed is not acceptable.

In the arrangement shown in Figure 1 the torque required to drive the rotor 11 is readily determined by measuring the power input to the motor 1 by means of a wattmeter 12. The relationship between watts input and driving torque for the particular motor is established by test, preferably with the motor winding both hot and cold, and the watts input corresponding to the maximum permissible torque is readily determined. It is then only necessary to observe the wattmeter reading for each rotor tested, and note whether it is above or below the maximum permissible input to the motor 1. An index mark may be placed on the wattmeter 12, where a large number of rotors of the same design are to be tested, and the test can readily be applied, even by an inexperienced operator, merely by putting a rotor in position, starting the motor 1, and observing whether the reading of the wattmeter 12 is above or below the mark. If the reading is above the mark, the rotor is defective and is to be rejected.

Fig. 3 shows typical complete speed-torque curves for both acceptable and defective rotors of the same design. These curves extend over the complete range of speed from synchronous speed in the positive direction to synchronous speed in the negative or reverse direction. It will be observed that the curves marked $a$ have considerably lower torque at negative speeds than the curves marked $b$. This indicates that the stray losses of the two rotors corresponding to the curves $a$ are lower than the stray losses of the rotor corresponding to the curves $b$. In this particular case, the rotors of the curves $a$ are acceptable, while the rotors of the curves $b$ have excessive stray losses and should be rejected. It will be apparent from inspection of Fig. 3 that the torque at negative speeds provides a positive and reliable means of distinguishing between acceptable rotors and those which should be rejected. The apparatus shown in Figure 1 provides a simple and easily operated means for applying this test.

In the embodiment of the invention shown in Figure 1, the rotor 11 is driven by a motor 1, and the torque is determined by measuring the power input to the motor. This is the preferred embodiment of the apparatus, and is well adapted for use in testing rotors in high production. Other means might be employed, however, for driving the rotor and measuring the torque. Thus, if desired, the rotor 11 might be driven by a dynamometer and the torque measured directly. The arrangement of Figure 1, however, is less expensive, and is somewhat simpler to operate.

The rotor resistance may be determined simultaneously with the determination of the stray loss. Thus, as previously explained, the current in the test stator winding 6 varies approximately inversely with the rotor resistance. The rotor resistance can therefore be determined by measuring the current in the winding 6 by means of an ammeter 13. The current in the winding 6 decreases as the rotor resistance increases, and a minimum value of current can readily be established for any given rotor design, corresponding to the maximum permissible resistance. If the reading of the ammeter 13 is below this minimum value, the resistance of the rotor is too high and it should be rejected.

It should now be apparent that a method and means have been provided by which squirrel-cage rotors can be tested for stray loss and resistance quickly and easily, and which is relatively inexpensive. Thus, in testing a rotor, the rotor is merely slipped on the shaft 8 and locked in position by the nut 10. The driving motor 1 and the test stator winding 6 are then energized, and the readings of the wattmeter 12 and of the ammeter 13 are observed. If the wattmeter reading is below the predetermined maximum, and if the ammeter reading is above the predetermined minimum, the rotor is acceptable. If either reading is outside the permissible range, the rotor is to be rejected. The rotor 11 is then removed, another one placed on the shaft 8 for test, and so on. It will be seen, therefore, that this test can be applied quite rapidly, and it is very suitable for routine testing of rotors in high production. It also has the advantage that it can easily be performed by an inexperieced operator since it is only necessary to observe whether the wattmeter and ammeter readings are below or above index marks which may be placed on them.

A preferred embodiment of the invention has been illustrated and described, but it is to be understood that it is not limited to the specific embodiment shown, since in its broadest aspects it includes all modifications and embodiments which come within the scope of the appended claims.

We claim as our invention:

1. A method of testing squirrel-cage rotors for electric motors, said method comprising providing a test stator having a polyphase winding, exciting said winding to produce a rotating magnetic field, placing a rotor to be tested in said magnetic field, driving the rotor at a predetermined speed in the opposite direction to the direction of rotation of the magnetic field, and measuring the torque required to drive the rotor.

2. A method of testing squirrel-cage rotors for electric motors, said method comprising providing a test stator having a polyphase winding, exciting said winding to produce a rotating magnetic field, placing a rotor to be tested in said magnetic field, driving the rotor at a predetermined speed in the opposite direction to the direction of rotation of the magnetic field, and measuring the torque required to drive the rotor and the current in the winding of the test stator.

3. A method of testing squirrel-cage rotors for electric motors, said method comprising providing a test stator having a polyphase winding, exciting said winding to produce a rotating magnetic field, placing a rotor to be tested in said magnetic field, providing a motor for driving the rotor, driving the rotor by means of said motor at a predetermined speed in the direction opposite to the direction of rotation of said magnetic field, and measuring the power input to the motor.

4. A method of testing squirrel-cage rotors for electric motors, said method comprising providing a test stator having a polyphase winding, exciting said winding to produce a rotating magnetic field, placing a rotor to be tested in said magnetic field, providing a motor for driving the rotor, driving the rotor by means of said motor at a predetermined speed in the direction opposite to the direction of rotation of said magnetic field, measuring the power input to the motor, and measuring the current in the winding of the test stator.

5. Means for testing squirrel-cage rotors for electric motors, said testing means comprising a test stator having a polyphase winding adapted to be energized from a polyphase source of electric energy for producing a rotating magnetic field, means for rotatably supporting a rotor to be tested in said magnetic field, means for driving said rotor at a predetermined speed in the direction opposite to the direction of rotation of said magnetic field, and means for measuring the torque required to drive the rotor.

6. Means for testing squirrel-cage rotors for electric motors, said testing means comprising a test stator having a polyphase winding adapted to be energized from a polyphase source of electric energy for producing a rotating magnetic field, means for rotatably supporting a rotor to be tested in said magnetic field, means for driving said rotor at a predetermined speed in the direction opposite to the direction of rotation of said magnetic field, means for measuring the torque required to drive the rotor, and means for measuring the current in the winding of the test stator.

7. Means for testing squirrel-cage rotors for electric motors, said testing means comprising a test stator having a polyphase winding adapted to be energized from a polyphase source of electric energy for producing a rotating magnetic field, means for rotatably supporting a rotor to be tested in said magnetic field, a motor for driving said rotor at a predetermined speed in the direction opposite to the direction of rotation of said magnetic field, and means for measuring the power input to said motor.

8. Means for testing squirrel-cage rotors for electric motors, said testing means comprising a test stator having a polyphase winding adapted to be energized from a polyphase source of electric energy for producing a rotating magnetic field, means for rotatably supporting a rotor to be tested in said magnetic field, a motor for driving said rotor at a predetermined speed in the direction opposite to the direction of rotation of said magnetic field, means for measuring the power input to said motor, and means for measuring the current in the winding of the test stator.

LEWIS C. PACKER.
GEORGE E. MONCHAMP.

REFERENCES CITED

The following references are of record in the file of this patent:

UNITED STATES PATENTS

| Number | Name | Date |
| --- | --- | --- |
| 774,018 | Wust-Kunz | Nov. 1, 1904 |
| 1,600,071 | Shaifer | Sept. 14, 1926 |
| 1,942,920 | Fawkes | Jan. 9, 1934 |
| 2,028,374 | Anderson | Jan. 21, 1936 |
| 2,352,779 | Ehrenfeld | July 4, 1944 |